(12) United States Patent
Bao et al.

(10) Patent No.: US 12,108,463 B2
(45) Date of Patent: Oct. 1, 2024

(54) METHOD FOR TRANSMITTING EDT DATA AND DEVICE

(71) Applicant: VIVO MOBILE COMMUNICATION CO., LTD., Guangdong (CN)

(72) Inventors: Wei Bao, Chang'an Dongguan (CN); Yumin Wu, Chang'an Dongguan (CN); Yitao Mo, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 340 days.

(21) Appl. No.: 17/569,800

(22) Filed: Jan. 6, 2022

(65) Prior Publication Data

US 2022/0132597 A1 Apr. 28, 2022

Related U.S. Application Data

(63) Continuation of application No. PCT/CN2020/100006, filed on Jul. 2, 2020.

(30) Foreign Application Priority Data

Jul. 11, 2019 (CN) .......................... 201910626129.6

(51) Int. Cl.
*H04W 74/0833* (2024.01)
*H04W 52/36* (2009.01)
*H04W 72/02* (2009.01)
*H04W 72/0446* (2023.01)
*H04W 74/08* (2024.01)

(52) U.S. Cl.
CPC ..... *H04W 74/0841* (2013.01); *H04W 52/365* (2013.01); *H04W 72/02* (2013.01); *H04W 72/0446* (2013.01); *H04W 74/0866* (2013.01)

(58) Field of Classification Search
CPC ........... H04W 74/0841; H04W 52/365; H04W 72/02; H04W 72/0446; H04W 74/0866; H04W 72/1268; H04W 74/0833
See application file for complete search history.

(56) References Cited

U.S. PATENT DOCUMENTS

2019/0141515 A1 5/2019 Kim et al.
2019/0159260 A1 5/2019 Charbit et al.
(Continued)

FOREIGN PATENT DOCUMENTS

CN 108702784 A 10/2018
CN 109286942 A 1/2019
(Continued)

OTHER PUBLICATIONS

IN Office Action in Application No. 202227002419 Dated Jun. 8, 2022.
(Continued)

*Primary Examiner* — Chae S Lee
(74) *Attorney, Agent, or Firm* — Brooks Kushman P.C.

(57) ABSTRACT

Embodiments of this disclosure disclose a method for transmitting EDT data and a device. The method is executed by a terminal device and includes: selecting a PUSCH resource from target physical uplink shared channel PUSCH resource(s), where the target PUSCH resource is a PUSCH resource used for Msg A transmission in a 2-step random access procedure; and transmitting EDT data by using the selected PUSCH resource.

16 Claims, 3 Drawing Sheets

100

Select a PUSCH resource from target PUSCH resource(s), where the target PUSCH resource is a PUSCH resource used for Msg A transmission in a 2-step random access procedure ~ S102

Transmit EDT data by using the selected PUSCH resource ~ S104

(56) References Cited

U.S. PATENT DOCUMENTS

| | | | |
|---|---|---|---|
| 2019/0215872 A1 | 7/2019 | Park et al. | |
| 2019/0394808 A1* | 12/2019 | Lee | H04W 74/006 |
| 2021/0058963 A1 | 2/2021 | Mu et al. | |
| 2021/0160902 A1* | 5/2021 | Shi | H04W 72/044 |
| 2021/0337597 A1 | 10/2021 | Yoshimura et al. | |
| 2022/0060974 A1 | 2/2022 | Zeng et al. | |
| 2022/0070938 A1* | 3/2022 | Wu | H04L 1/189 |
| 2022/0095389 A1* | 3/2022 | Chen | H04W 72/21 |

FOREIGN PATENT DOCUMENTS

| | | |
|---|---|---|
| CN | 109511156 A | 3/2019 |
| CN | 109863783 A | 6/2019 |
| WO | 2018139575 A1 | 8/2018 |
| WO | 2019062926 A1 | 4/2019 |
| WO | 2019095324 A1 | 5/2019 |
| WO | 2019098713 A1 | 5/2019 |
| WO | 2020149660 A1 | 7/2020 |
| WO | 2020221861 A1 | 11/2020 |

OTHER PUBLICATIONS

"Discussion on channel structure for 2-step RACH" 3GPP TSG RAN WG1 #96bis, vivo, R1-1904059, Apr. 8, 2019.

"Report of email discussion [99bis#55][MTC/NB-IoT] EDT RRC messages" 3GPP TSG-RAN WG2 Meeting#100, Huawei, R2-1713182, Nov. 27, 2017.

"Views on NR small data transmission enhancements in Rel-17" 3GPP TSG-RAN Meeting #85, vivo, RP-191895, Sep. 16, 2019.

Written Opinion and International Search Report in Application No. PCT/CN2020/100006 Dated Oct. 10, 2020.

CN Office Action in Application No. 201910626129.6 Dated Jul. 5, 2022.

European Search Report in Application No. 20836439.8 Dated Jul. 28, 2022.

"2-step CBRA procedure" 3GPP TSG-RAN WG2 Meeting #103, MediaTek Inc., R2-1812342, Aug. 20, 2018.

"Report of Email Discussion [103#55][NR-U] 2-step RACH Model and Initial Information Contents (Qualcomm)" 3GPP TSG-RAN WG2 Meeting #103bis, Qualcomm Incorporated, R2-1815564, Oct. 8, 2018.

* cited by examiner

METHOD FOR TRANSMITTING EDT DATA AND DEVICE

CROSS-REFERENCE TO RELATED APPLICATIONS

The present application is a continuation application of International Application No. PCT/CN2020/100006 filed on Jul. 2, 2020, which claims priority to Chinese Patent Application No. 201910626129.6, filed with the China National Intellectual Property Administration on Jul. 11, 2019 and entitled "METHOD FOR TRANSMITTING EDT DATA AND DEVICE", both of which are incorporated herein by reference in its entirety.

TECHNICAL FIELD

Embodiments of this disclosure relate to the communication field, and in particular, to a method for transmitting early data transmission (EDT) data and a device.

BACKGROUND

For efficient transmission of sparse small data, an EDT technology is introduced into LTE. The technology is mainly applied to uplink, so that a terminal device can perform data transmission in an idle state (Idle) and an inactive state (Inactive) without radio resource control (RRC) state change.

The NR stage sees more extensive application scenarios for efficient transmission of small data, for example, the field of IOT and the field of wearable device. In addition, NR has introduced a 2-step random access (2-step RACH) procedure. At present, in the NR 2-step RACH procedure, there is no solution to how a terminal device selects an appropriate uplink resource to transmit EDT data.

SUMMARY

Embodiments of this disclosure are intended to provide a method for transmitting EDT data and a device, so as to resolve the problem that a terminal device is unable to select an appropriate uplink resource to transmit EDT data.

According to a first aspect, a method for transmitting EDT data is provided, where the method is executed by a terminal device and includes:
selecting a PUSCH resource from target physical uplink shared channel PUSCH resource(s), where the target PUSCH resource is a PUSCH resource used for Msg A transmission in a 2-step random access procedure; and
transmitting EDT data by using the selected PUSCH resource.

According to a second aspect, a terminal device is provided, including:
a resource selection module, configured to select a PUSCH resource from target physical uplink shared channel PUSCH resource(s), where the target PUSCH resource is a PUSCH resource used for Msg A transmission in a 2-step random access procedure; and
a transmission module, configured to transmit EDT data by using the selected PUSCH resource.

According to a third aspect, a terminal device is provided, where the terminal device includes a processor, a memory, and a computer program stored in the memory and capable of running on the processor, and when the computer program is executed by the processor, the steps of the method for transmitting EDT data according to the first aspect are implemented.

According to a fourth aspect, a computer-readable storage medium is provided, where the computer-readable storage medium stores a computer program, and when the computer program is executed by a processor, the steps of the method for transmitting EDT data according to the first aspect are implemented.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the accompanying drawings.

DESCRIPTION OF EMBODIMENTS

To make the objectives, technical solutions, and advantages of this disclosure clearer, the following clearly describes the technical solutions of this disclosure with reference to specific embodiments of this disclosure and corresponding drawings. Apparently, the described embodiments are merely some rather than all the embodiments of this disclosure. All other embodiments that a person of ordinary skill in the art obtains without creative efforts based on the embodiments of this disclosure shall fall within the protection scope of this disclosure.

It should be understood that, the technical solutions in the embodiments of this disclosure may be applied to various communications systems, such as a long term evolution (LTE) system, an LTE frequency division duplex FDD) system, an LTE time division duplex (TDD) system, a universal mobile telecommunications system (UMTS), a worldwide interoperability for microwave access (WiMAX) communications system, a 5G system or a new radio (NR) system, or a later evolved communications system.

In the embodiments of this disclosure, a terminal device may include but is not limited to a mobile station (MS), a mobile terminal (Mobile Terminal), a mobile telephone (Mobile Telephone), user equipment (UE), a handset (handset), portable equipment (portable equipment), a vehicle (vehicle), and the like. The terminal device may communicate with one or more core networks via a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

Figure 1:
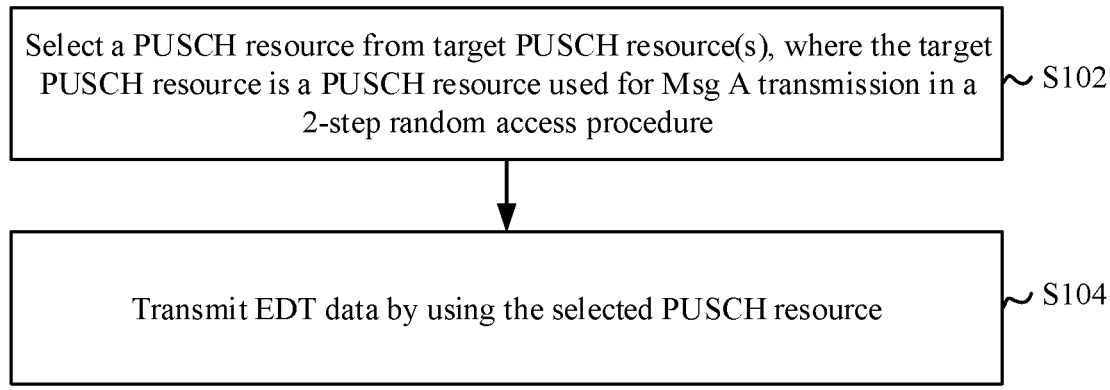
FIG. 1 is a schematic flowchart of a method for transmitting EDT data according to an embodiment of this disclosure.

As shown in FIG. 1, a method 100 for transmitting EDT data is provided in an embodiment of this disclosure. The method may be executed by a terminal device and includes the following steps.

S102: Select a PUSCH resource from target physical uplink shared channel (PUSCH) resource(s), where the target PUSCH resource is a PUSCH resource used for Msg A transmission in a 2-step random access procedure.

Before implementation of the embodiments of this specification, a network device may configure a PUSCH resource used for Msg A transmission (including the above-mentioned target PUSCH resource) for the terminal device.

Figure 2:
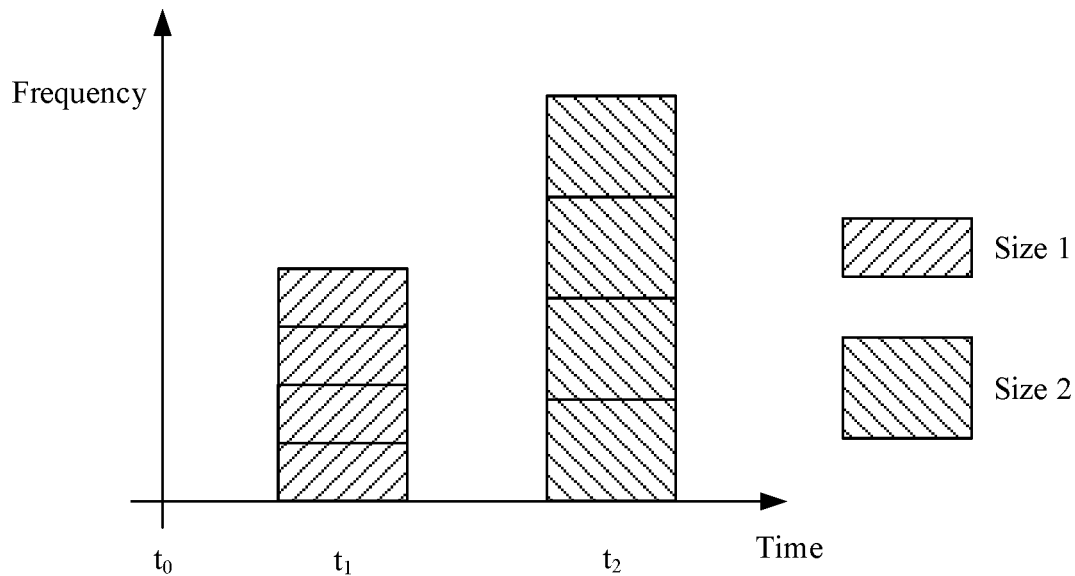
FIG. 2 is a schematic diagram of a PUSCH resource used for Msg A transmission according to an embodiment of this disclosure.
Figure 3:
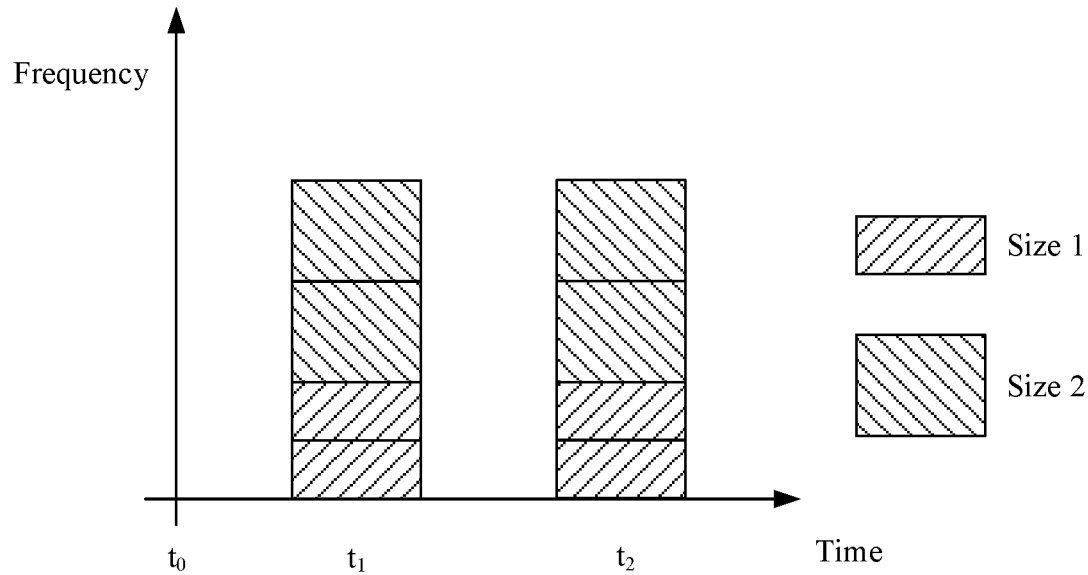
FIG. 3 is a schematic diagram of a PUSCH resource used for Msg A transmission according to another embodiment of this disclosure.

As shown in FIG. 2 and FIG. 3, FIG. 2 and FIG. 3 exemplarily illustrate PUSCH resources of two different sizes. In FIG. 2, there are four PUSCH resources of size 1 at time $t_1$ and four PUSCH resources of size 2 at time $t_2$, where size 2 is greater than size 1. Time $t_0$ may be a start time for a transmission requirement of EDT data. In FIG. 3, there are two PUSCH resources of size 1 and two PUSCH resources of size 2 at time $t_1$; and there are two PUSCH resources of size 1 and two PUSCH resources of size 2 at time $t_2$.

FIG. 2 and FIG. 3 merely exemplarily list PUSCH resources of two different sizes. In practice, the network device may configure PUSCH resources of more different sizes, and the PUSCH resources are mixedly interleaved in time division and frequency division manners. For example, there are PUSCH resources of two different sizes, size 1 and size 2, at time $t_1$; there are PUSCH resources of three different sizes, size 2, size 3, and size 4, at time $t_2$; there are PUSCH resources of two different sizes, size 3 and size 4, at time $t_3$, and the like. Then configurations of each group are duplicate according to a given cycle.

After having configured the PUSCH resource used for Msg A transmission, the network device may also indicate, by using a display switch (that is, EDT function switch) in a system information block (SIB), whether EDT data transmission is supported.

If the EDT function switch is turned on, the terminal device needs to transmit EDT data, and but no uplink resource is available at this time, the terminal device may determine, based on a condition, whether it can use the PUSCH resource used for Msg A transmission to transmit the EDT data. An EDT data transmission condition may be at least one of the following:

being in an idle state or an inactive state;
being in a connected state, with no appropriate uplink dedicated resource for transmitting the EDT data;
quality of service of a service reaching a preset threshold, for example, a delay meeting a threshold, and/or reliability meeting a threshold;
a size of arrived service data meeting a transmission requirement of a PUSCH for Msg A transmission, for example, being smaller than a largest size of a PUSCH for Msg A;
a type of the terminal device being a preset type, such as Internet of things IoT terminal device, and machine type communication MTC terminal device; and
service arrival meeting a preset condition, for example, a condition in which the terminal device only needs to transmit such EDT data and there is no subsequent data.

Optionally, the target PUSCH resource in S102 may be one of the following four types.

1) PUSCH resource that meets a transmission requirement and that is closest to a target time domain location.

The target time domain location may be a start time for a transmission requirement of EDT data; a time at which it is confirmed that an EDT data transmission condition is met, or the like. A target time domain location mentioned in subsequent embodiments is similar to that in this embodiment.

In FIG. 2, for example, the target time domain location is time $t_0$, if a PUSCH resource of size 1 can meet the transmission requirement, the target PUSCH resources are the four PUSCH resources at time $t_1$ and one may be randomly selected from the four PUSCH resources of size 1 in step S102; if the PUSCH resource of size 1 is unable to meet the transmission requirement and a PUSCH resource of size 2 can meet the transmission requirement, the target PUSCH resources are the four PUSCH resources at time $t_2$ and one may be randomly selected from the four PUSCH resources of size 2 in step S102.

2) PUSCH resource that meets a transmission requirement within a time window.

Before this embodiment, the network device may configure duration of the time window. A start time of the time window may be a start time for a transmission requirement of EDT data, as indicated by the time window in FIG. 4; or may be a location of the first PUSCH resource after a start time for the transmission requirement of the EDT data, and the like.

Figure 4:
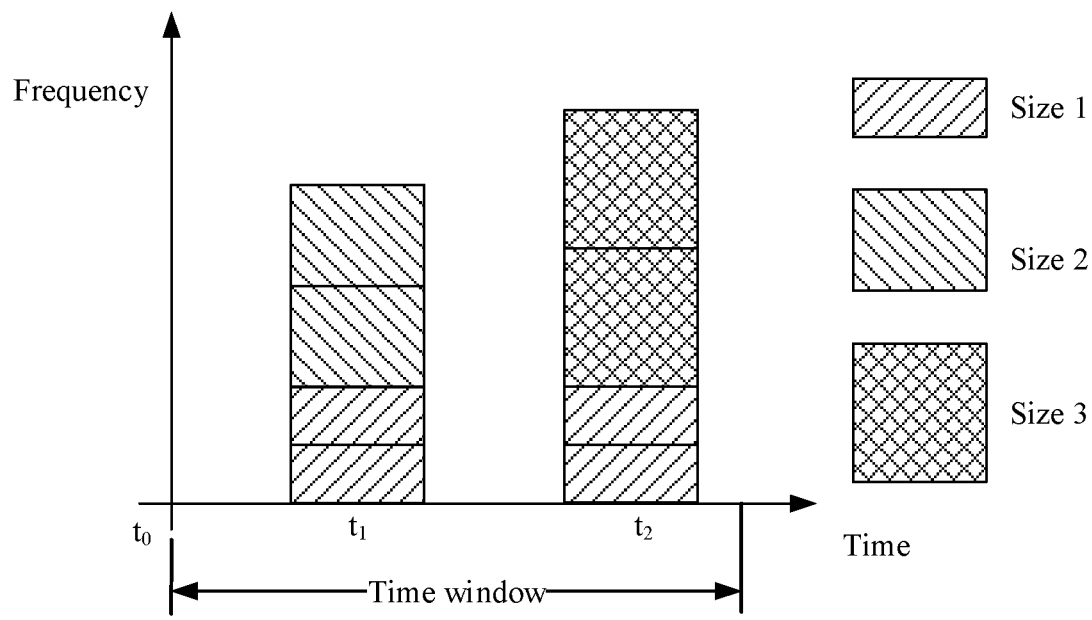
FIG. 4 is a schematic diagram of a PUSCH resource used for Msg A transmission according to still another embodiment of this disclosure.

In an example shown in FIG. 4, if the PUSCH resource of size 1 is unable to meet the transmission requirement and the PUSCH resources of size 2 and size 3 can meet the transmission requirement, the target PUSCH resources are two PUSCH resources of size 2 at time $t_1$ and two PUSCH resources of size 3 at time $t_2$, and one may be randomly selected from the four PUSCH resources in step S102.

3) PUSCH resource that meets a transmission requirement within a range of N configuration parameters, where N is an integer greater than 1.

The N configuration parameters include: N time domain locations, where a PUSCH resource that meets the transmission requirement is present in at least one of the N time domain locations; or N time domain locations, where a PUSCH resource that meets the transmission requirement is present at all the N time domain locations.

4) M PUSCH resources that meet a transmission requirement, where M is an integer greater than 1.

Optionally, in this embodiment, after an EDT data transmission condition is met, M contiguous PUSCH resources that meet the transmission requirement may be searched for. Between the M PUSCH resources that meet the transmission requirements, no other PUSCH resources that meet the transmission requirement exist.

The PUSCH resource that meets the transmission requirement of the EDT data mentioned in the embodiments of this specification may be one or a combination of the following:

1) a PUSCH resource that is able to accommodate a data amount greater than or equal to a data amount of the EDT data;
2) a PUSCH resource whose transmission configuration (such as power configuration) can meet the transmission requirement of the EDT data; and
3) a PUSCH resource whose resource size can meet the transmission requirement of the EDT data, and the like.

The size of the PUSCH resource mentioned in the embodiments of this specification typically means a resource size of the PUSCH resource.

S104: Transmit EDT data by using the selected PUSCH resource.

In this step, the terminal device may use the selected PUSCH resource to transmit EDT data. Certainly, the terminal device may also transmit RRC signaling by using the selected PUSCH resource. In this embodiment, the EDT data and the RRC signaling may be referred to as a Msg A; certainly, the Msg A may also include a preamble transmitted by using a PRACH resource, where the PRACH resource is in a mapping relationship with the selected PUSCH resource.

After having transmitted the Msg A, the terminal device waits to receive a Msg B. If a corresponding Msg B is received correctly, and content in the Msg B indicates that the EDT data is transmitted successfully, a process of transmitting the EDT data ends.

In a case that a terminal device has an EDT data transmission requirement, the method for transmitting EDT data provided in this embodiment of this disclosure can select a PUSCH resource from PUSCH resource(s) used for Msg A transmission in a 2-step random access procedure, and transmit EDT data by using the selected PUSCH resource. This resolves the problem that the terminal device is unable to select an appropriate uplink resource to transmit the EDT data, helping improve communication effectiveness.

The target PUSCH resource in the foregoing transmission method 100 is typically provided in plurality. The selecting a PUSCH resource from target physical uplink shared channel PUSCH resource(s) in S102 includes one of the following:

1. selecting a smallest-sized PUSCH resource from PUSCH resources that meet the transmission requirement in the target PUSCH resources; where optionally, if there are a plurality of smallest-sized PUSCH resources, one is randomly selected from the plurality of smallest-sized PUSCH resources;
2. selecting a largest-sized PUSCH resource from PUSCH resources that meet the transmission requirement in the target PUSCH resources; where optionally, if there are a plurality of largest-sized PUSCH resources, one is randomly selected from the plurality of largest-sized PUSCH resources;
3. randomly selecting a PUSCH resource that meets the transmission requirement from the target PUSCH resources; and
4. selecting a PUSCH resource that meets a transmission requirement from the target PUSCH resources based on a preset weight.

The following describes in detail the method for transmitting EDT data provided in the foregoing embodiments of this disclosure with reference to several specific embodiments.

Embodiment 1

In a case that a terminal device meets a condition for transmitting EDT data by using a PUSCH resource used for Msg A transmission, that is, in a case that the EDT data transmission condition is met, as mentioned in the foregoing embodiment, the terminal device selects, from PUSCH resources used for Msg A transmission, a PUSCH resource that is closest to a target time domain location and that meets a transmission requirement, to transmit a Msg A.

Using a time division diagram in FIG. 2 as an example, in a case that the terminal device has an EDT data transmission requirement at time $t=t_0$, where a data size of the EDT data satisfies x>size 1 and x<size 2, a location of a closest PUSCH resource that meets a transmission data size is a time domain location $t_2$ at which a PUSCH resource of size 2 is present in FIG. 2. At this time domain location, there are a plurality of (for example, four shown in FIG. 2) PUSCH resources that meet the condition. To reduce a possibility of collision, the terminal device randomly selects one PUSCH resource from the plurality of PUSCH resources that meet the transmission requirement at this same time domain location to transmit the Msg A, where the Msg A carries the EDT data.

In a case that PUSCH resources of different sizes are consistent in time domain but different in frequency domain, for example, the frequency division PUSCH resources shown in FIG. 3. In a case that the UE has an EDT data transmission requirement at time $t=t_0$, where an EDT data size satisfies x<size 1 and x<size 2, a PUSCH resource that meets the condition is at a first time domain location $t_1$ that is closest to time $t_0$ in FIG. 3. At this time domain location, there are a plurality of (for example, four shown in FIG. 3) PUSCH resources that meet the transmission requirement. In theory, the terminal device can select all these four PUSCH resources. In practical applications, the terminal device can perform a selection according to one of the following selection principles.

Selection principle 1: A smallest-sized PUSCH resource is selected from PUSCH resources that meet the transmission requirement and that are closest to the target time domain location.

Optionally, if there are a plurality of smallest-sized PUSCH resources, one PUSCH resource is randomly selected from the plurality of smallest-sized PUSCH resources. For example, in FIG. 3, one is randomly selected from two PUSCH resources of size 1 at time $t_1$.

Optionally, if there is one smallest-sized PUSCH resource, the smallest-sized PUSCH resource is directly selected.

Selection principle 2: One PUSCH resource is randomly selected from all PUSCH resources that meet the transmission requirement and that are closest to the target time domain location. For example, in FIG. 3, one is randomly selected from the four PUSCH resources at time $t_1$.

Selection principle 3: One is randomly selected according to different weights from all PUSCH resources that meet the transmission requirement and that are closest to the target time domain location.

Optionally, the weights are configured by the network device by using a SIB.

Optionally, the weights are inversely proportional to sizes of the PUSCH resources. For example, in the PUSCH resources that meet the transmission requirement, a smaller size of the PUSCH resource indicates a higher probability of being selected.

Optionally, a standard can specify that, for example, in the PUSCH resources that meet the transmission requirement, a weight of a smallest-sized PUSCH resource being selected is 1; a weight of a larger PUSCH resource being selected is 0.5; a weight of a still larger PUSCH resource being selected is 0.25; and so on.

Selection principle 4: The selection principle 4 includes the following two situations:

4.1. In a case that the terminal device belongs to a preset type, such as low capacity/low complexity, or power saving/low power, a smallest-sized PUSCH resource is selected from PUSCH resources that meet the transmission requirement and that are closest to the target time domain location.

Optionally, if there are a plurality of smallest-sized PUSCH resources, one PUSCH resource is randomly selected from the plurality of smallest-sized PUSCH resources. For example, in FIG. 3, one is randomly selected from two PUSCH resources of size 1 at time $t_1$.

Optionally, if there is one smallest-sized PUSCH resource, the smallest-sized PUSCH resource is directly selected.

4.2. In a case that the terminal device does not belong to the preset type, one PUSCH resource is randomly selected from PUSCH resources that meet the transmission requirement and that are closest to the target time domain location.

Selection principle 5: The selection principle 5 includes the following two situations:

5.1. In a case that the terminal device is at the edge of cell coverage, for example, a path loss meets a threshold or an uplink power reaches a preset condition, a smallest-sized PUSCH resource is selected from PUSCH resources that meet the transmission requirement and that are closest to the target time domain location.

Optionally, if there are a plurality of smallest-sized PUSCH resources, one PUSCH resource is randomly selected from the plurality of smallest-sized PUSCH resources. For example, in FIG. 3, one is randomly selected from two PUSCH resources of size 1 at time $t_1$.

Optionally, if there is one smallest-sized PUSCH resource, the smallest-sized PUSCH resource is directly selected.

5.2. In a case that a path loss of the terminal device does not meet a threshold condition or an uplink power does not meet a preset condition, one PUSCH resource is randomly selected from PUSCH resources that meet the transmission requirement and that are closest to the target time domain location.

Selection principle 6: The selection principle 6 includes the following two situations:

6.1. In a case that the terminal device reattempts to transmit EDT data after power ramp, a smallest-sized PUSCH resource is selected from PUSCH resources that meet the transmission requirement and that are closest to the target time domain location.

Optionally, if there are a plurality of smallest-sized PUSCH resources, one PUSCH resource is randomly selected from the plurality of smallest-sized PUSCH resources. For example, in FIG. 3, one is randomly selected from two PUSCH resources of size 1 at time $t_1$.

Optionally, if there is one smallest-sized PUSCH resource, the smallest-sized PUSCH resource is directly selected.

6.2. In a case that the terminal device reattempts to transmit the EDT data not after power ramp, one PUSCH resource is randomly selected from PUSCH resources that meet the transmission requirement and that are closest to the target time domain location.

Selection principle 7: In a case that the terminal device has a capacity headroom or a power headroom, one PUSCH resource is randomly selected from PUSCH resources that meet the transmission requirement and that are closest to the target time domain location. Certainly, if there is one PUSCH resource that meets the transmission requirement and that is closest to the target time domain location, that PUSCH resource is directly selected.

Selection principle 8: The selection principle 8 includes the following two situations:

8.1. In a case that the terminal device has a capacity headroom or a power headroom, a smallest-sized PUSCH resource is selected from PUSCH resources that meet the transmission requirement and that are closest to the target time domain location.

Optionally, if there are a plurality of smallest-sized PUSCH resources, one PUSCH resource is randomly selected from the plurality of smallest-sized PUSCH resources. For example, in FIG. 3, one is randomly selected from two PUSCH resources of size 1 at time $t_1$.

Optionally, if there is one smallest-sized PUSCH resource, the smallest-sized PUSCH resource is directly selected.

8.2. In a case that the terminal device does not have any capacity headroom or power headroom, one PUSCH resource is randomly selected from PUSCH resources that meet the transmission requirement and that are closest to the target time domain location.

After having transmitted the Msg A, the terminal device waits to receive a Msg B. If a corresponding Msg B is received correctly, and content in the Msg B indicates that the EDT data is transmitted successfully, a process of transmitting the EDT data ends.

Embodiment 2

In the PUSCH resource selection scheme provided in Embodiment 1, a terminal device can initiate a 2-step RACH procedure as soon as possible to transmit EDT data. This improves transmission efficiency of the EDT data, but is also likely to cause collision (for example, a plurality of users initiate such procedures at the same time) and waste of resources (for example, a PUSCH resource that is closest to a target time domain location has a much larger size than the transmission requirement). In Embodiment 2, a method for selecting a PUSCH resource is provided to resolve the problem.

In a case that a transmission delay requirement for EDT data is not particularly high, for example, a delay-tolerate service, the terminal device can select a PUSCH within a given time window. A size of the time window and a rule for using the time window can be configured by a network device or specified by a standard.

For example, different time window sizes may be used based on QoS features of services. For a service having a high delay requirement, a small time window may be used or selection may be initiated immediately; for a service having a low delay requirement, a large time window may be used. Alternatively, the terminal device does not use a time window when initiating a 2-step RACH procedure normally, and starts a time window only in a RACH procedure with EDT data.

A start time of the time window may be a start time of an EDT data transmission requirement, or other specified time, for example, a time domain location of the first PUSCH resource after an EDT data transmission condition is met.

A size of the time window may be measured at a granularity of subframes or milliseconds.

In a case that the terminal device is configured with a time window of EDT, typically, there is a PUSCH resource that meets a transmission requirement at a plurality of time domain locations within the time window. For example, in FIG. 4, the terminal device has an EDT data transmission requirement at time $t_0$, and a length of the time window is shown in FIG. 4. It can be seen that there are PUSCH resources of different sizes at time $t_1$ and time $t_2$ in FIG. 4.

Assuming that an EDT data size satisfies x>size 1, x<size 2, and x<size 3, a total of four PUSCH resources (resource blocks) within the time window meet the transmission requirement in size (two sizes 2 and two sizes 3). In theory, the terminal device can select all the four PUSCH resources.

In practical applications, the terminal device can make a selection according to one of the following principles:

Selection principle 1: A PUSCH smallest-sized resource is selected from PUSCH resources that meet the transmission requirement within the time window.

Optionally, if there are a plurality of smallest-sized PUSCH resources, one PUSCH resource is randomly selected from the plurality of smallest-sized PUSCH resources. For example, in FIG. 4, one is randomly selected from two PUSCH resources of size 2 at time $t_1$.

Optionally, if there is one smallest-sized PUSCH resource, the smallest-sized PUSCH resource is directly selected.

Selection principle 2: A PUSCH resource is randomly selected from the PUSCH resource that meets the transmission requirement within the time window. For example, in FIG. 4, one is randomly selected from two PUSCH resources of size 2 at time $t_1$ and two PUSCH resources of size 3 at time $t_2$ (four in total).

Selection principle 3: One is randomly selected according to different weights from the PUSCH resource that meets the transmission requirement within the time window.

Optionally, the weights are configured by the network device by using a SIB.

Optionally, the weights are inversely proportional to sizes of the PUSCH resources. For example, in the PUSCH resources that meet the transmission requirement, a smaller size of the PUSCH resource indicates a higher probability of being selected.

Optionally, a standard can specify that, for example, in the PUSCH resources that meet the transmission requirement, a weight of a smallest-sized PUSCH resource being selected is 1; a weight of a larger PUSCH resource being selected is 0.5; a weight of a still larger PUSCH resource being selected is 0.25; and so on.

Selection principle 4: The selection principle 4 includes the following two situations:

4.1. In a case that the terminal device belongs to a preset type, such as low capacity/low complexity, or power saving/low power, a smallest-sized PUSCH resource is selected from the PUSCH resource that meets the transmission requirement within the time window.

Optionally, if there are a plurality of smallest-sized PUSCH resources, one PUSCH resource is randomly selected from the plurality of smallest-sized PUSCH resources. For example, in FIG. 4, one is randomly selected from two PUSCH resources of size 2 at time $t_1$.

Optionally, if there is one smallest-sized PUSCH resource, the smallest-sized PUSCH resource is directly selected.

4.2. In a case that the terminal device does not belong to the preset type, one PUSCH resource is randomly selected from the PUSCH resource that meets the transmission requirement within the time window.

Selection principle 5: The selection principle 5 includes the following two situations:

5.1. In a case that the terminal device is at the edge of cell coverage, for example, a path loss meets a threshold or an uplink power reaches a preset condition, a smallest-sized PUSCH resource is selected from the PUSCH resource that meets the transmission requirement within the time window.

Optionally, if there are a plurality of smallest-sized PUSCH resources, one PUSCH resource is randomly selected from the plurality of smallest-sized PUSCH resources. For example, in FIG. 4, one is randomly selected from two PUSCH resources of size 2 at time $t_1$.

Optionally, if there is one smallest-sized PUSCH resource, the smallest-sized PUSCH resource is directly selected.

5.2. In a case that a path loss of the terminal device does not meet a threshold condition or an uplink power does not meet a preset condition, one PUSCH resource is randomly selected from target PUSCH resources that meet the transmission requirement within the time window.

Selection principle 6: The selection principle 6 includes the following two situations:

6.1. In a case that the terminal device reattempts to transmit EDT data after power ramp, a smallest-sized PUSCH resource is selected from the PUSCH resource that meets the transmission requirement within the time window.

Optionally, if there are a plurality of smallest-sized PUSCH resources, one PUSCH resource is randomly selected from the plurality of smallest-sized PUSCH resources. For example, in FIG. 4, one is randomly selected from two PUSCH resources of size 2 at time $t_1$.

Optionally, if there is one smallest-sized PUSCH resource, the smallest-sized PUSCH resource is directly selected.

6.2. In a case that the terminal device reattempts to transmit the EDT data not after power ramp, one PUSCH resource is randomly selected from the PUSCH resource that meets the transmission requirement within the time window.

Selection principle 7: In a case that the terminal device has a capacity headroom or a power headroom, one PUSCH resource is randomly selected from the PUSCH resource that meets the transmission requirement within the time window. Certainly, if there is one PUSCH resource that meets the transmission requirement within the time window, that PUSCH resource is directly selected.

Selection principle 8: The selection principle 8 includes the following two situations:

8.1. In a case that the terminal device has a capacity headroom or a power headroom, one smallest-sized PUSCH resource is selected from the PUSCH resource that meets the transmission requirement within the time window.

Optionally, if there are a plurality of smallest-sized PUSCH resources, one PUSCH resource is randomly selected from the plurality of smallest-sized PUSCH resources. For example, in FIG. 4, one is randomly selected from two PUSCH resources of size 2 at time $t_1$.

Optionally, if there is one smallest-sized PUSCH resource, the smallest-sized PUSCH resource is directly selected.

8.2. In a case that the terminal device does not have any capacity headroom or power headroom, one PUSCH resource is randomly selected from the PUSCH resource that meets the transmission requirement within the time window.

In the above plurality of selection principles, in a case that a basic transmission requirement and a power requirement are met, if there are a plurality of PUSCH resources that meet the transmission requirement, the smallest-sized PUSCH resource is selected (preferentially or with a higher probability) as much as possible in the above examples (method 1), to reduce overheads and power consumption.

However, there is another method (method 2), that is, selecting a largest-sized PUSCH resource as much as possible (preferentially or with a higher probability) instead of the smallest-sized PUSCH resource, to achieve a better transmission effect.

The two selection methods, method 1 and method 2, may be specified in a standard, or may be configured by the network device; or even the network device may configure a condition so that the terminal device uses different selection methods when different conditions are met. For example, the terminal device prioritizing power saving uses method 1; or the terminal device prioritizing performance uses method 2.

After having transmitted the Msg A, the terminal device waits to receive a Msg B. If a corresponding Msg B is received correctly, and content in the Msg B indicates that the EDT data is transmitted successfully, a process of transmitting the EDT data ends.

Embodiment 3

In this embodiment, another method for selecting a PUSCH resource similar to that in Embodiment 2 is provided.

In a case that an EDT data transmission delay requirement is not particularly high, for example, for a delay-tolerate service, a terminal device can select a PUSCH in a given time domain range, for example, selecting a PUSCH within a range of N configuration parameters, where N is an integer greater than 1.

A rule for the range of N configuration parameters is configured by a network device or specified by a standard. For example, different configuration parameter ranges may be used based on QoS features of services. For a service having a high delay requirement, a small configuration parameter range may be used or selection may be initiated immediately; for a service having a low delay requirement, a large configuration parameter range may be used. Alternatively, the terminal device does not use a configuration parameter range when it normally initiates a 2-step RACH procedure, but uses a configuration parameter range only in a RACH procedure with EDT data.

Configuration of the range of N configuration parameters (or referred to as a range of delay) may be one of the following options:

1. Starting from a trigger time of the EDT data, if the number of PUSCH resources that meet a transmission requirement reaches a configuration threshold N, one PUSCH resource is selected from N PUSCH resources that meet the transmission requirement.

2. Starting from a trigger time of the EDT data, if a PUSCH resource that meets the transmission requirement is present in at least one of N time domain locations, one PUSCH resource that meets the transmission requirement is selected from the range.

3. Starting from a trigger time of the EDT data, a PUSCH resource that meets the transmission requirement is present at all of N time domain locations (which may be non-contiguous), a PUSCH resource that meets the transmission requirement is selected from the range.

It should be noted that the configuration parameter ranges are all represented by using the parameter N. In practical applications, a value of N may be different under different configurations.

When the terminal device is configured with the range of N configuration parameters, a plurality of PUSCH resources that meet an EDT data transmission requirement are present within the range of N configuration parameters. In theory, the terminal device can select the plurality of PUSCH resources. In practical applications, the terminal device can make a selection according to one of the following principles:

Selection principle 1: Within the range of N configuration parameters, a smallest-sized PUSCH resource that meets the transmission requirement is selected.

Optionally, if there are a plurality of smallest-sized PUSCH resources, one PUSCH resource is randomly selected from the plurality of smallest-sized PUSCH resources.

Optionally, if there is one smallest-sized PUSCH resource, the smallest-sized PUSCH resource is directly selected.

Selection principle 2: Within the range of N configuration parameters, one PUSCH resource that meets the transmission requirement is randomly selected.

Selection principle 3: One is randomly selected according to different weights from the PUSCH resource that meets the transmission requirement within the range of N configuration parameters.

Optionally, the weights are configured by the network device by using a SIB.

Optionally, the weights are inversely proportional to sizes of the PUSCH resources. For example, in the PUSCH resources that meet the transmission requirement, a smaller size of the PUSCH resource indicates a higher probability of being selected.

Optionally, a standard can specify that, for example, in the PUSCH resources that meet the transmission requirement, a weight of a smallest-sized PUSCH resource being selected is 1; a weight of a larger PUSCH resource being selected is 0.5; a weight of a still larger PUSCH resource being selected is 0.25; and so on.

Selection principle 4: The selection principle 4 includes the following two situations:

4.1. In a case that the terminal device belongs to a preset type, such as low capacity/low complexity, or power saving/low power, a smallest-sized PUSCH resource that meets the transmission requirement is selected within the range of N configuration parameters.

Optionally, if there are a plurality of smallest-sized PUSCH resources, one PUSCH resource is randomly selected from the plurality of smallest-sized PUSCH resources.

Optionally, if there is one smallest-sized PUSCH resource, the smallest-sized PUSCH resource that meets the transmission requirement is directly selected.

4.2. In a case that the terminal device does not belong to the preset type, one PUSCH resource that meets the transmission requirement is randomly selected within the range of N configuration parameters.

Selection principle 5: The selection principle 5 includes the following two situations:

5.1. In a case that the terminal device is at the edge of cell coverage, for example, a path loss meets a threshold or an uplink power reaches a preset condition, a smallest-sized PUSCH resource that meets the transmission requirement is selected within the range of N configuration parameters.

Optionally, if there are a plurality of smallest-sized PUSCH resources, one PUSCH resource is randomly selected from the plurality of smallest-sized PUSCH resources.

Optionally, if there is one smallest-sized PUSCH resource, the smallest-sized PUSCH resource is directly selected.

5.2. In a case that a path loss of the terminal device does not meet a threshold condition or an uplink power does not meet a preset condition, one is randomly selected from the PUSCH resource that meets the transmission requirement within the range of N configuration parameters.

Selection principle 6: The selection principle 6 includes the following two situations:

6.1. In a case that the terminal device reattempts to transmit the EDT data after power ramp, a smallest-sized PUSCH resource that meets the transmission requirement is selected within the range of N configuration parameters.

Optionally, if there are a plurality of smallest-sized PUSCH resources, one is randomly selected from the plurality of smallest-sized PUSCH resources.

Optionally, if there is one smallest-sized PUSCH resource, the smallest-sized PUSCH resource is directly selected.

6.2. In a case that the terminal device reattempts to transmit the EDT data not after power ramp, one is randomly selected from the PUSCH resource that meets the transmission requirement within the range of N configuration parameters.

Selection principle 7: In a case that the terminal device has a capacity headroom or a power headroom, one PUSCH resource is randomly selected from the PUSCH resource that meets the transmission requirement within the range of N configuration parameters. Certainly, if there is one PUSCH resource that meets a transmission requirement within the range of N configuration parameters, that PUSCH resource is directly selected.

Selection principle 8: The selection principle 8 includes the following two situations:

8.1. In a case that the terminal device has a capacity headroom or a power headroom, one smallest-sized PUSCH resource is selected from the PUSCH resource that meets the transmission requirement within the range of N configuration parameters.

Optionally, if there are a plurality of smallest-sized PUSCH resources, one PUSCH resource is randomly selected from the plurality of smallest-sized PUSCH resources.

Optionally, if there is one smallest-sized PUSCH resource, the smallest-sized PUSCH resource is directly selected.

8.2. In a case that the terminal device does not have any capacity headroom or power headroom, one PUSCH resource is randomly selected from the PUSCH resource that meets the transmission requirement within the range of N configuration parameters.

In the above plurality of selection principles, in a case that a basic transmission requirement and a power requirement are met, if there are a plurality of PUSCH resources that meet the transmission requirement, the smallest-sized PUSCH resource is selected (preferentially or with a higher probability) as much as possible in the above examples (method 1), to reduce overheads and power consumption.

However, there is another method (method 2), that is, selecting a largest-sized PUSCH resource as much as possible (preferentially or with a higher probability) instead of the smallest-sized PUSCH resource, to achieve a better transmission effect.

The two selection methods, method 1 and method 2, may be specified in a standard, or may be configured by the network device; or even the network device may configure a condition so that the terminal device uses different selection methods when different conditions are met. For example, the terminal device prioritizing power saving uses method 1; or the terminal device prioritizing performance uses method 2.

After having transmitted the Msg A, the terminal device waits to receive a Msg B. If a corresponding Msg B is received correctly, and content in the Msg B indicates that the EDT data is transmitted successfully, a process of transmitting the EDT data ends.

Embodiment 4

In the foregoing embodiments, a size of a PUSCH resource is a major consideration in determining whether the PUSCH resource meets a transmission requirement of EDT data. However, in practice, in addition to the size of the resource, other conditions may need to be considered. For example, a PUSCH resource may be selected with reference to at least one of the following:

a size of data that a PUSCH resource is able to accommodate;

the number of repeated transmissions; and a transmission parameter. The transmission parameter may be transmission power; or may be a parameter, other than the transmission power, that is related to transmission reliability, transmission overhead, and the like.

In practical applications, when it is determined whether the PUSCH resource meets the transmission requirement of EDT data based on the "closest" principle in Embodiment 1, the time window in Embodiment 2, the range of N configuration parameters in Embodiment 3, usually at least one of the following also needs to be considered:

A size of data that the PUSCH resource is able to accommodate needs to be not less than an amount of EDT data to be transmitted. Typically, the transmission is more efficient when the size of data is equal to or slightly larger than the EDT data. From the perspective of a terminal device, transmission power consumption and redundant padding are reduced; from the perspective of a network device, resource utilization is high, so as to avoid unnecessary waste of resources.

The number of repeated transmissions of a PUSCH.

Typically, a larger number of repeated transmissions indicates a higher successful transmission rate and reliability, but also a higher power consumption and delay of the terminal device and a higher resource consumption of the network device. Therefore, it is necessary to make a compromised choice between effect and overhead.

A transmission parameter other than transmission power of the PUSCH.

The transmission parameter may be a parameter related to both transmission reliability and overhead, and a good balance between them is required.

Transmission power of the PUSCH.

When the terminal device is a specially designed device, transmission power of the terminal device is limited possibly due to reasons such as power saving and cost. In this case, the terminal device may not support transmit power required by some PUSCH resources. Therefore, only those supported by the terminal device can be selected, based on the consideration of improving the success rate and moderating overheads as much as possible.

The above considerations of the PUSCH configurations from different aspects can still be used in combination with the previous three embodiments to select the PUSCH resource that meets the transmission requirement at the closest time domain location, or select the appropriate PUSCH resource in the configured time window, or select the appropriate PUSCH resource within the range of N configured parameters.

Specifically, whether the PUSCH resources meet the condition can be determined with reference to this embodiment, and based on the selection principles in the previous three embodiments, the PUSCH resource used for the EDT data is selected randomly or according to a given rule from the PUSCH resource that meets the condition.

Embodiment 5

In the foregoing embodiments, the methods for selecting a PUSCH resource in a RACH procedure with EDT are provided. However, there is an exception: no PUSCH resource that meets a transmission requirement is found, for example, there is no PUSCH resource that meets a transmission size, or a delay is too long, or a transmission condition such as power is not met.

In this case, a terminal device can randomly select one of PUSCH resources that are closest to a target time domain location, and initiate a traditional RACH procedure without EDT data.

In the method for transmitting EDT data provided in Embodiments 1 to 5 of this disclosure, in a case that the terminal device has an EDT data transmission requirement, a PUSCH resource can be selected from PUSCH resources used for Msg A transmission in a 2-step random access procedure, and EDT data is transmitted by using the selected PUSCH resource. This resolves the problem that the terminal device is unable to select an appropriate uplink resource to transmit the EDT data, helping improve communication effectiveness.

In addition, in the foregoing embodiments, the efficiency of transmitting uplink EDT data by the terminal device is improved, the signaling overheads for RRC state change and reconfiguration are prevented, and the delay is reduced to some extent. In addition, the uplink resources can be properly selected based on a PUSCH resource size, a delay requirement, and a capability of the terminal device, reaching a balance between transmission effect and overhead and greatly improving the resource efficiency.

The method for transmitting EDT data according to the embodiments of this disclosure is described in detail above with reference to FIG. 1 to FIG. 4. A terminal device according to an embodiment of this disclosure is described below in detail with reference to FIG. 5.

Figure 5:
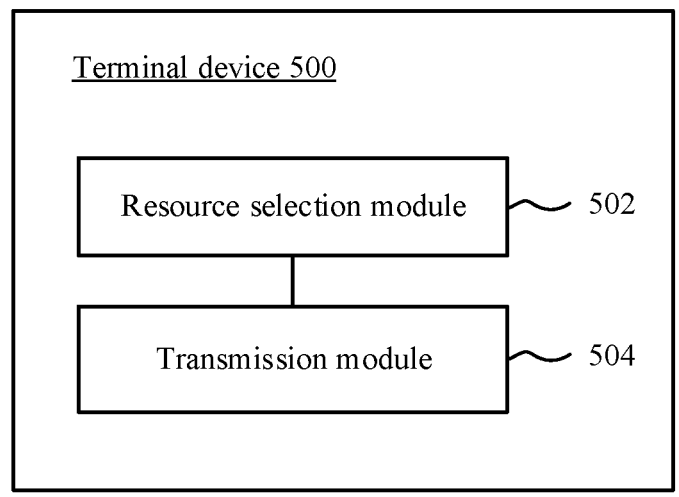
FIG. 5 is a schematic structural diagram of a terminal device according to an embodiment of this disclosure.

FIG. 5 is a schematic structural diagram of a terminal device according to an embodiment of this disclosure. As shown in FIG. 5, the terminal device 500 includes:

a resource selection module 502, configured to select a PUSCH resource from target physical uplink shared channel PUSCH resources, where the target PUSCH resource is a PUSCH resource used for Msg A transmission in a 2-step random access procedure; and a transmission module 504, configured to transmit EDT data by using the selected PUSCH resource.

In this embodiment of this disclosure, in a case that the terminal device has an EDT data transmission requirement, a PUSCH resource may be selected from PUSCH resources used for Msg A transmission in a 2-step random access procedure, and EDT data is transmitted by using the selected PUSCH resource. This resolves the problem that the terminal device is unable to select an appropriate uplink resource to transmit the EDT data, helping improve communication effectiveness.

Optionally, in an embodiment, the target PUSCH resource includes:

a PUSCH resource that meets a transmission requirement and that is closest to a target time domain location, where the target time domain location includes a start time for a transmission requirement of the EDT data; or a PUSCH resource that meets a transmission requirement within a target time window; or a PUSCH resource that meets a transmission requirement within a range of N configuration parameters, where N is an integer greater than 1; or M PUSCH resources that meet a transmission requirement, where M is an integer greater than 1.

Optionally, in an embodiment, the N configuration parameters include:

N time domain locations, where a PUSCH resource that meets the transmission requirement is present in at least one of the N time domain locations; or N time domain locations, where a PUSCH resource that meets the transmission requirement is present at all the N time domain locations.

Optionally, in an embodiment, the target PUSCH resource is provided in plurality, and the resource selection module 502 may be specifically configured to:

select a smallest-sized PUSCH resource from the target PUSCH resources; or select a largest-sized PUSCH resource from the target PUSCH resources; or randomly select a PUSCH resource from the target PUSCH resources; or select a PUSCH resource from the target PUSCH resources based on a preset weight.

Optionally, in an embodiment, if there are a plurality of smallest-sized PUSCH resources, the resource selection module 502 may be specifically configured to randomly select one PUSCH resource from the plurality of smallest-sized PUSCH resources; or if there are a plurality of largest-sized PUSCH resources, the resource selection module 502 may be specifically configured to randomly select one PUSCH resource from the plurality of largest-sized PUSCH resources.

Optionally, in an embodiment, the resource selection module 502 may be specifically configured to:

in a case that the terminal device belongs to a preset type, if the target PUSCH resources include a plurality of smallest-sized PUSCH resources, randomly select one PUSCH resource from the plurality of smallest-sized PUSCH resources; or if the target PUSCH resources include one smallest-sized PUSCH resource, directly select the smallest-sized PUSCH resource; or in a case that the terminal device does not belong to a preset type, randomly select the PUSCH resource from the target PUSCH resources.

Optionally, in an embodiment, the resource selection module 502 may be specifically configured to:

in a case that a path loss of the terminal device meets a threshold or an uplink power meets a preset condition, if the target PUSCH resources include a plurality of smallest-sized PUSCH resources, randomly select one PUSCH resource from the plurality of smallest-sized PUSCH resources; or if the target PUSCH resources include one smallest-sized PUSCH resource, directly select the smallest-sized PUSCH resource; or in a case that a path loss of the terminal device does not meet a threshold condition or an uplink power does not meet a preset condition, randomly select the PUSCH resource from the target PUSCH resources.

Optionally, in an embodiment, the resource selection module 502 may be specifically configured to:

in a case that the terminal device reattempts to transmit the EDT data after power ramp, if the target PUSCH resources include a plurality of smallest-sized PUSCH resources, randomly select one PUSCH resource from the plurality of smallest-sized PUSCH resources; or if the target PUSCH resources include one smallest-sized PUSCH resource, directly select the smallest-sized PUSCH resource; or in a case that the terminal device reattempts to transmit the EDT data not after power ramp, randomly select the PUSCH resource from the target PUSCH resources.

Optionally, in an embodiment, the resource selection module 502 may be specifically configured to:

in a case that the terminal device has a capacity headroom or a power headroom, randomly select the PUSCH resource from the target PUSCH resources.

Optionally, in an embodiment, the resource selection module 502 may be specifically configured to:

in a case that the terminal device has a capacity headroom or a power headroom, if the target PUSCH resources include a plurality of largest-sized PUSCH resources, randomly select one PUSCH resource from the plurality of largest-sized PUSCH resources; or if the target PUSCH resources include one largest-sized PUSCH resource, directly select the largest-sized PUSCH resource; or in a case that the terminal device does not have any capacity headroom or power headroom, randomly select the PUSCH resource from the target PUSCH resources.

Optionally, in an embodiment, the resource selection module 502 may be specifically configured to
  select a PUSCH resource from the target PUSCH resources according to at least one of the following:
  a size of data that the target PUSCH resource is able to accommodate;
  the number of repeated transmissions; and
  a transmission parameter.

Optionally, in an embodiment, the transmission module 504 may be further configured to:
  if no PUSCH resource that meets a transmission requirement is selected from the target PUSCH resources, initiate the 2-step random access procedure, where the EDT data is not transmitted in the 2-step random access procedure.

Optionally, in an embodiment, the resource selection module 502 may be specifically configured to select a PUSCH resource from the target PUSCH resources in a case that at least one of the following is satisfied:
  being in an idle state or an inactive state;
  being in a connected state, with no appropriate uplink dedicated resource for transmitting the EDT data;
  quality of service of a service reaching a preset threshold;
  a size of arrived service data meeting a transmission requirement of a PUSCH for Msg A transmission;
  a type of the terminal device being a preset type; and
  service arrival meeting a preset condition.

For the terminal device 500 according to this embodiment of this disclosure, reference may be made to the procedure of the method 100 in the corresponding embodiments of this disclosure. In addition, the units or modules in the terminal device 500 and the foregoing other operations and/or functions are respectively intended to implement the corresponding procedures in the method 100, and the same or equivalent technical effects can be achieved. Details are not repeated herein for brevity.

Figure 6:
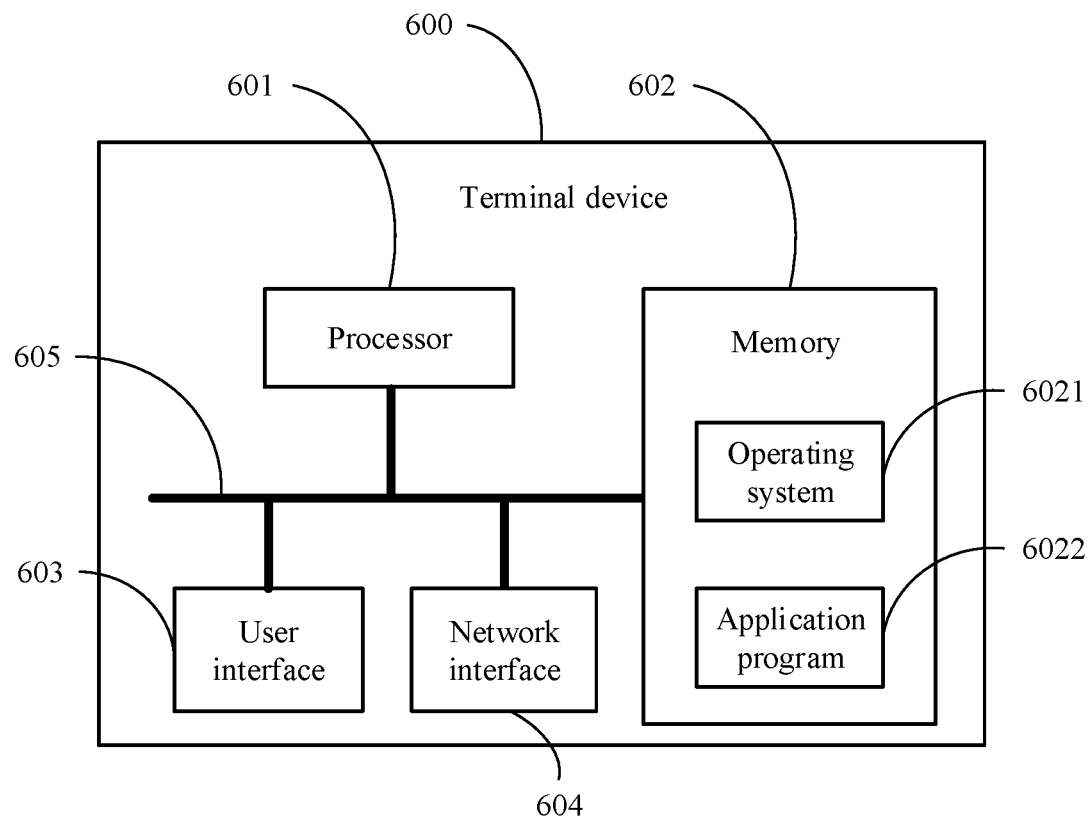
FIG. 6 is a schematic structural diagram of a terminal device according to another embodiment of this disclosure.

FIG. 6 is a block diagram of a terminal device according to another embodiment of this disclosure. The terminal device 600 shown in FIG. 6 includes: at least one processor 601, a memory 602, at least one network interface 604, and a user interface 603. The components in the terminal device 600 are coupled together through a bus system 605. It can be understood that the bus system 605 is configured to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, a click device (for example, a mouse or a trackball (trackball)), a touch board, or a touchscreen.

It can be understood that the memory 602 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 602 of the system and the method described in the embodiments of this disclosure is intended to include but not limited to these and any other applicable types of memories.

In some implementations, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player (Media Player) and a browser (Browser), which are used to implement various application services. A program for implementing the method in the embodiments of this disclosure may be included in the application program 6022.

In this embodiment of this disclosure, the terminal device 600 further includes a computer program stored in the memory 602 and capable of running on the processor 601. When being executed by the processor 601, the computer program implements the steps of the method 100.

The methods disclosed in the foregoing embodiments of this disclosure may be applied to the processor 601, or may be implemented by the processor 601. The processor 601 may be an integrated circuit chip, having a signal processing capability. During implementation, the steps of the foregoing method may be completed by hardware integrated logic circuits in the processor 601 or instructions in the form of software. The processor 601 may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, steps, and logical block diagrams disclosed in the embodiments of this disclosure may be implemented or executed. The general-purpose processor may be a microprocessor, or the processor may be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory or electrically erasable programmable memory, or a register. The computer-readable storage medium is located in the memory 602, and the processor 601 fetches information in the memory 602, and completes the steps of the foregoing method in combination with its hardware. Specifically, the computer-readable storage medium stores a computer program, and when the computer program is executed by the processor 601, the steps in the foregoing method 100 are implemented.

It may be understood that the embodiments described in the embodiments of this disclosure may be implemented by hardware, software, firmware, middleware, microcode, or a combination thereof. For hardware implementation, a processing unit may be implemented in one or more application-specific integrated circuits (ASIC), digital signal processors (DSP), digital signal processing devices (DSPD), programmable logic devices PLD), field programmable gate arrays (FPGA), general-purpose processors, controllers, microcontrollers, microprocessors, other electronic units used to implement the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

The terminal device 600 can implement the processes implemented by the terminal device in the foregoing embodiments, and same or equivalent technical effects can be achieved. To avoid repetition, details are not described herein again.

An embodiment of this disclosure further provides a computer-readable storage medium, where the computer-readable storage medium stores a computer program. When the computer program is executed by a processor, the processes of the foregoing method embodiment 100 are implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, persons skilled in the art may clearly understand that the methods in the foregoing embodiments may be implemented by using software in combination with a necessary universal hardware platform, and certainly may alternately be implemented by using hardware. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing embodiments of this disclosure are described with reference to the accompanying drawings. However, this disclosure is not limited to the foregoing specific implementations. The foregoing specific implementations are merely illustrative rather than restrictive. Inspired by this disclosure, a person of ordinary skill in the art may still derive many variations without departing from the essence of this disclosure and the protection scope of the claims. All these variations shall fall within the protection of this disclosure.

What is claimed is:

1. A method for transmitting early data transmission (EDT) data, wherein the method is executed by a terminal device, and the method comprises:
   selecting a physical uplink shared channel (PUSCH) resource from target PUSCH resource(s), wherein the target PUSCH resource is a PUSCH resource used for Msg A transmission in a 2-step random access procedure; and
   transmitting EDT data by using the selected PUSCH resource;
   wherein the target PUSCH resource comprises: a PUSCH resource that meets a transmission requirement within a range of N configuration parameters, wherein N is an integer greater than 1; and
   wherein the N configuration parameters comprise:
   N time domain locations, wherein a PUSCH resource that meets the transmission requirement is present in at least one of the N time domain locations; or
   N time domain locations, wherein a PUSCH resource that meets the transmission requirement is present at all the N time domain locations.

2. The method according to claim 1, wherein the target PUSCH resource is provided in plurality, and the selecting a PUSCH resource from target physical uplink shared channel PUSCH resource(s) comprises:
   selecting a smallest-sized PUSCH resource from the target PUSCH resources; or
   selecting a largest-sized PUSCH resource from the target PUSCH resources; or
   randomly selecting a PUSCH resource from the target PUSCH resources; or
   selecting a PUSCH resource from the target PUSCH resources based on a preset weight.

3. The method according to claim 2, wherein
   if there are a plurality of smallest-sized PUSCH resources, the selecting a smallest-sized PUSCH resource from the target PUSCH resources further comprises: randomly selecting one PUSCH resource from the plurality of smallest-sized PUSCH resources; or
   if there are a plurality of largest-sized PUSCH resources, the selecting a largest-sized PUSCH resource from the target PUSCH resources further comprises: randomly selecting one PUSCH resource from the plurality of largest-sized PUSCH resources.

4. The method according to claim 1, wherein the selecting a PUSCH resource from target physical uplink shared channel PUSCH resource(s) comprises:

in a case that the terminal device belongs to a preset type, if the target PUSCH resources comprise a plurality of smallest-sized PUSCH resources, randomly selecting one PUSCH resource from the plurality of smallest-sized PUSCH resources; or if the target PUSCH resources comprise one smallest-sized PUSCH resource, directly selecting the smallest-sized PUSCH resource; or in a case that the terminal device does not belong to a preset type, randomly selecting the PUSCH resource from the target PUSCH resources.

5. The method according to claim 1, wherein the selecting a PUSCH resource from target physical uplink shared channel PUSCH resource(s) comprises:

in a case that a path loss of the terminal device meets a threshold or an uplink power meets a preset condition, if the target PUSCH resources comprise a plurality of smallest-sized PUSCH resources, randomly selecting one PUSCH resource from the plurality of smallest-sized PUSCH resources; or if the target PUSCH resources comprise one smallest-sized PUSCH resource, directly selecting the smallest-sized PUSCH resource; or in a case that a path loss of the terminal device does not meet a threshold condition or an uplink power does not meet a preset condition, randomly selecting the PUSCH resource from the target PUSCH resources.

6. The method according to claim 1, wherein the selecting a PUSCH resource from target physical uplink shared channel PUSCH resource(s) comprises:

in a case that the terminal device reattempts to transmit the EDT data after power ramp, if the target PUSCH resources comprise a plurality of smallest-sized PUSCH resources, randomly selecting one PUSCH resource from the plurality of smallest-sized PUSCH resources; or if the target PUSCH resources comprise one smallest-sized PUSCH resource, directly selecting the smallest-sized PUSCH resource; or in a case that the terminal device reattempts to transmit the EDT data not after power ramp, randomly selecting the PUSCH resource from the target PUSCH resources.

7. The method according to claim 1, wherein the selecting a PUSCH resource from target physical uplink shared channel PUSCH resource(s) comprises:

in a case that the terminal device has a capacity headroom or a power headroom, randomly selecting the PUSCH resource from the target PUSCH resources.

8. The method according to claim 1, wherein the selecting a PUSCH resource from target physical uplink shared channel PUSCH resource(s) comprises:

in a case that the terminal device has a capacity headroom or a power headroom, if the target PUSCH resources comprise a plurality of largest-sized PUSCH resources, randomly selecting one PUSCH resource from the plurality of largest-sized PUSCH resources; or if the target PUSCH resources comprise one largest-sized PUSCH resource, directly selecting the largest-sized PUSCH resource; or in a case that the terminal device does not have any capacity headroom or power headroom, randomly selecting the PUSCH resource from the target PUSCH resources.

9. The method according to claim 1, wherein the selecting a PUSCH resource from target physical uplink shared channel PUSCH resources comprises: selecting the PUSCH resource from the target PUSCH resources based on at least one of the following:

a size of data that the target PUSCH resource is able to accommodate;

the number of repeated transmissions; and a transmission parameter.

10. The method according to claim 1, wherein the method further comprises:

if no PUSCH resource that meets a transmission requirement is selected from the target PUSCH resources, initiating a 2-step random access procedure, wherein the EDT data is not transmitted in the 2-step random access procedure.

11. The method according to claim 1, wherein the selecting a PUSCH resource from target physical uplink shared channel PUSCH resource(s) comprises: selecting the PUSCH resource from the target PUSCH resource(s) in a case that at least one of the following conditions is satisfied:

being in an idle state or an inactive state;

being in a connected state, with no appropriate uplink dedicated resource for transmitting the EDT data;

quality of service of a service reaching a preset threshold;

a size of arrived service data meeting a transmission requirement of a PUSCH for Msg A transmission;

a type of the terminal device being a preset type; and service arrival meeting a preset condition.

12. A terminal device, comprising: a memory, a processor, and a computer program stored in the memory and capable of running on the processor, wherein when the computer program is executed by the processor, the following steps are implemented:

selecting a physical uplink shared channel (PUSCH) resource from target PUSCH resource(s), wherein the target PUSCH resource is a PUSCH resource used for Msg A transmission in a 2-step random access procedure; and transmitting EDT data by using the selected PUSCH resource;

wherein the target PUSCH resource comprises: a PUSCH resource that meets a transmission requirement within a range of N configuration parameters, wherein N is an integer greater than 1; and wherein the N configuration parameters comprise:

N time domain locations, wherein a PUSCH resource that meets the transmission requirement is present in at least one of the N time domain locations; or N time domain locations, wherein a PUSCH resource that meets the transmission requirement is present at all the N time domain locations.

13. The terminal device according to claim 12, wherein the target PUSCH resource is provided in plurality, and the selecting a PUSCH resource from target physical uplink shared channel PUSCH resource(s) comprises:

selecting a smallest-sized PUSCH resource from the target PUSCH resources; or selecting a largest-sized PUSCH resource from the target PUSCH resources; or randomly selecting a PUSCH resource from the target PUSCH resources; or selecting a PUSCH resource from the target PUSCH resources based on a preset weight.

14. The terminal device according to claim 13, wherein if there are a plurality of smallest-sized PUSCH resources, the selecting a smallest-sized PUSCH resource from the target PUSCH resources further comprises: randomly selecting one PUSCH resource from the plurality of smallest-sized PUSCH resources; or if there are a plurality of largest-sized PUSCH resources, the selecting a largest-sized PUSCH resource from the target PUSCH resources further comprises: randomly selecting one PUSCH resource from the plurality of largest-sized PUSCH resources.

15. The terminal device according to claim 12, wherein the selecting a PUSCH resource from target physical uplink shared channel PUSCH resource(s) comprises:
- in a case that the terminal device belongs to a preset type, if the target PUSCH resources comprise a plurality of smallest-sized PUSCH resources, randomly selecting one PUSCH resource from the plurality of smallest-sized PUSCH resources; or if the target PUSCH resources comprise one smallest-sized PUSCH resource, directly selecting the smallest-sized PUSCH resource; or
- in a case that the terminal device does not belong to a preset type, randomly selecting the PUSCH resource from the target PUSCH resources.

16. A non-transitory computer-readable storage medium, wherein the non-transitory computer-readable storage medium stores a computer program, and when the computer program is executed by a processor, the steps of the method for transmitting EDT data according to claim 1 are implemented.

* * * * *